(No Model.)

S. H. TERRY.
TRANSMITTING POWER FROM CABLE WAYS.

No. 270,509. Patented Jan. 9, 1883.

Witnesses. Inventor.
Samuel H. Terry,
per.
Attorneys.

UNITED STATES PATENT OFFICE.

SAMUEL H. TERRY, OF CHICAGO, ILLINOIS.

TRANSMITTING POWER FROM CABLE-WAYS.

SPECIFICATION forming part of Letters Patent No. 270,509, dated January 9, 1883.

Application filed October 5, 1882. (No model.)

*To all whom it may concern:*

Be it known that I, SAMUEL H. TERRY, residing at Chicago, in the county of Cook and State of Illinois, and a citizen of the United States, have invented new and useful Improvements in Transmitting Power from Cable-Ways, of which the following is a full description, reference being had to the accompanying drawings, in which—

Figure 1:
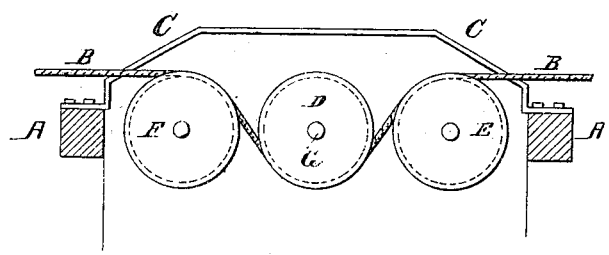
Figure 2:
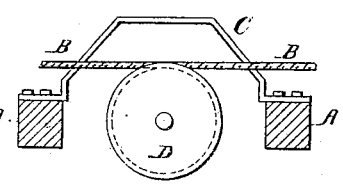
Figure 3:
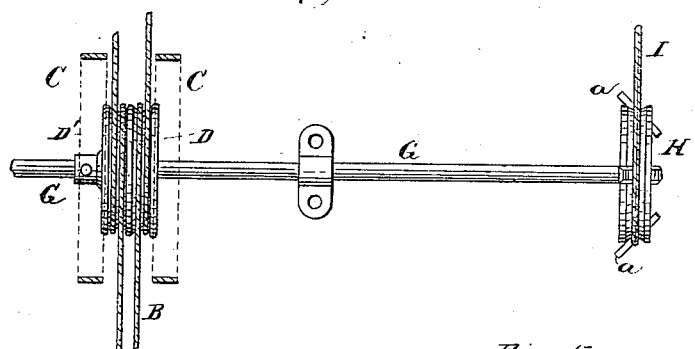
Figure 4:
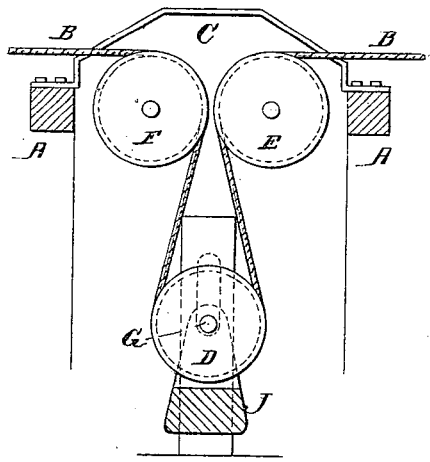
Figure 5:
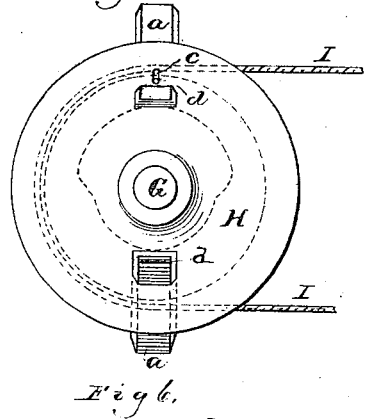
Figure 6:
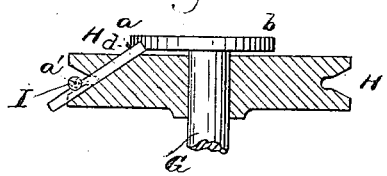

Figure 1 is a sectional view showing the cable, a transmitting and secondary wheels supporting the cable; Fig. 2, a sectional view showing the cable running around a transmitting-wheel; Fig. 3, a top or plan view, showing a cable, a power-transmitting wheel, a shaft, and a secondary wheel for conveying the power, through a cable or otherwise, to a machine or other device for driving purposes; Fig. 4, a sectional view showing an arrangement of deflecting-wheels, and a transmitting-wheel carrying a weight and forming a cable-tightener, as well as a power-transmitter; Figs. 5 and 6, a plan view and a cross-section, respectively, of a grooved friction-wheel arranged to give a cable of uniform diameter a positive grip for the purpose of transmitting power. These Figs. 5 and 6 are enlarged as compared with the remaining figures of the drawings.

The object of my invention is to utilize or partly utilize the wasted power of cables of traction rope railways by transmitting it to one side of the street, or to buildings along the street, for purposes of manufacture, or for driving the necessary machinery for producing an electric light for illuminating purposes; and its nature consists in connecting one or more wheels driven by the cable with a shaft and other connections for transmitting power, and in the combinations of parts, hereinafter set forth and claimed as new.

In the drawings, A represents the cross timbers or ties in the bottom of the tunnel or other passage-way for the cable; B, the cable; C, an arch or guard for raising the gripper of a car over the transmitting-wheels; D, the transmitting-wheel; E and F, secondary wheels for deflecting the cable; G, shaft; H, driving wheel or pulley at the end of the shaft G for taking the power; I, a driving rope or belt operated from the wheel H; and J, a weight; *a*, slides in the wheel H for gripping the cable or belt; *b*, an eccentric or cam for holding the slides *a* back, in case they become stuck or are in a wrong position; *c*, slot in the face of the wheel H, and *d* pin on the slides *a*.

My improvements are designed to be combined with and applied to a cable for an under-ground, an over-ground, or an elevated railway, and such railways and the cable therefor may be of any of the usual and well-known forms of construction. As shown in the drawings, the cable runs in an under-ground cable-way, and the ties or cross-timbers A support the tube for the cable and the track for the car, which are not shown, but are constructed and arranged as usual, and the cable B is a wire-rope cable of the ordinary construction for use in the class of railways named.

The arch or guard C is arranged over the wheels for transmitting the power of the cable, and is for the purpose of lifting the gripper connecting the cable and the car out of contact with the cable and allowing it to pass over the space occupied by the wheels, the grip, as it passes over the arch or guard, being automatically opened, releasing it from the cable, and after the arch or guard has passed again dropping into position to grasp the cable; but this forms no part of my present invention, and the grip and its devices are therefore not shown. In the drawings several forms of utilizing the power of the cable, in connection with a transmitting-wheel, are represented.

Figure 1 shows the cable B passing under the wheel D and over the wheels E and F, said wheels D, E, and F having suitable grooves for retaining the cable in place. In this form of construction the wheels E and F may simply act as idlers to deflect the rope to pass beneath the wheel D, which is the transmitting-wheel; or all three of the wheels may be utilized for transmitting power; or any one of the wheels D, E, or F may be so utilized, as may be desired. In this arrangement the deflection of the cable operates the wheels, such deflection producing a sufficient tautness of the cable to cause it to hug the wheels sufficiently to give them the necessary rotation.

Figs. 2 and 3 show an arrangement of cable and a single transmitting-wheel, D, such wheel being suitably grooved for the cable, and in this form the cable is made to pass around the wheel, thereby producing the necessary amount of friction for the driving of the wheel. Fig. 3 shows two cables and two wheels; but ordinarily only a single cable and a single wheel will be used, as two cables with two wheels in this style of railways but rarely occur.

Fig. 3 shows the transmitting-wheel for the cable mounted on a shaft, G, which is to be supported in suitable bearings, and arranged to suit the location and object for which the power is to be utilized. As shown, it has a wheel, H, at one end, over which a belt or rope, I, passes, and this wheel H, with the belt I, transmits the power to the machinery or other point for use; but it will be understood that the arrangement of the shaft G, wheel H, and belt or rope I is only one form of transmitting the power from the wheel D and cable, and that other arrangements of shafting, wheels, and belt can be used.

Fig. 4 shows an arrangement in which the cable passes over two wheels, E and F, down and under a wheel, D, essentially as in Fig. 1, except that in this form of arrangement the wheel D is journaled or mounted on a shaft or in sliding boxes, and carries a weight, J. The wheel D, in this form of construction, has a free vertical movement, allowing the weight J to rise and fall and act as a cable-tightener, so that this construction, in addition to the office of driving a transmitting-wheel, also furnishes a means for keeping the cable taut and in proper running order under all circumstances. The shaft, which receives the power from the wheel D in this form of arrangement, will need to be provided with a universal joint or coupling or tumbling-rod for connecting it with the wheel in order to allow of the vertical play of such wheel. This arrangement will be found to be one of the best forms of applying my invention, for the reason that it serves a double purpose—namely, transmitting the power of the cable, and furnishing a belt-tightener at the same time.

The wheel H, as shown, is grooved to suit a rope or cable; but for driving an ordinary flat belt its periphery may be left plain, as usual. This wheel H, when used for driving a wire cable or rope, is provided with slides $a$, which are inserted diagonally through the wheel, so as to lie partly in the groove for the cable or rope, one end extending beyond the periphery or rim of the wheel, and the other passing through one of the sides or faces, as shown in Figs. 5 and 6. These slides $a$ are provided with a notch or recess, $a'$, of sufficient depth to partially inclose the cable, the notch being curved transversely to conform to the outline of the wheel, and, as shown, the face or side of the wheel through which the slide passes is provided with a slot, $c$, and the slide is provided with a pin, $d$, passing through such slot, for the purpose of holding the slides in place, so that they will not drop out with the revolution of the wheel, and at the same time allowing them to have sufficient play for the action of grasping the cable.

In operation, as the wire rope or cable comes in contact with each slide, passing into the notch or indentation $a'$, it will act and carry the slide inward or toward the center of the wheel, slightly forcing the rope tightly against the coacting face of the groove in the wheel, producing a firm clamp of the cable between the face of the groove and the notch or indentation of the slide, by which any slipping of the cable or rope or belt on the surface of the wheel will be effectually prevented.

Usually the rotation of the wheel will cause the cable to release itself from the gripping-plates $a$ at the point where the cable leaves the surface of the wheel, and the cable will also act to force the slide into position to act as a gripper; but in order that the movements of slide may be certain, and that they are in position to act on the cable, an eccentric or cam, $b$, located adjacent to the face of the wheel, and supported in any suitable manner so as to be stationary, is provided, against the acting face of which the ends of the slides will come successively, forcing the slides outward and leaving the cable clear to run on the wheel. This same object, however, may be attained by providing each slide $a$ with a spring arranged to act and force the slides outward to clear the cable.

As shown, two slides $a$ are provided; but for a wheel of large diameter, four, six, or eight of such slides may be applied, though for a small wheel two will be found sufficient under ordinary circumstances. By using these slides $a$ in connection with a rotating wheel for transmitting power to a cable or belt a positive grip between the cable and the wheel is assured, so that no slipping of the belt or cable, and consequent loss of power, can possibly occur.

It is to be understood that the transmitting-wheels and deflecting-wheels are to be supported in suitable bearings, and that a line of shafting is to be connected with that one of the wheels from which the power is to be taken, and for this purpose a shaft, G, (shown in Fig. 3,) may be used, or such other arrangement of shafting as may be required.

What I claim as new, and desire to secure by Letters Patent, is—

1. The combination of the wheel D, shaft G, and wheel H with the cable B of a traction rope railway, substantially as and for the purpose specified.

2. The combination of the transmitting-wheel D, weight J, and shaft G, supported in movable bearings, in combination with the rope B of a traction rope railway, whereby the double office of driving the transmitting-wheel D and regulating the tension of the cable are subserved, substantially as described.

3. The slides $a$, constructed and operating substantially as described, in combination with the wheel H and rope I, substantially as set forth.

SAMUEL H. TERRY.

Witnesses:
ALBERT H. ADAMS,
O. W. BOND.